(12) United States Patent
Koumura

(10) Patent No.: US 7,665,704 B2
(45) Date of Patent: Feb. 23, 2010

(54) SEAT RAIL APPARATUS

(75) Inventor: Mitsunao Koumura, Motosu (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 641 days.

(21) Appl. No.: 11/374,541

(22) Filed: Mar. 14, 2006

(65) Prior Publication Data

US 2007/0114355 A1  May 24, 2007

(30) Foreign Application Priority Data

Mar. 22, 2005 (JP) ............................... 2005-081088
Feb. 22, 2006 (JP) ............................... 2006-045010

(51) Int. Cl.
*F16M 13/00* (2006.01)

(52) U.S. Cl. ..................... 248/430; 297/344.1; 248/503

(58) Field of Classification Search ................. 248/424, 248/429, 430, 503, 503.1; 297/344.1, 344.11; 296/65.13, 65.14, 65.15
See application file for complete search history.

(56) References Cited

U.S. PATENT DOCUMENTS

| | | | | |
|---|---|---|---|---|
| 6,220,642 B1 * | 4/2001 | Ito et al. | .................. | 296/65.14 |
| 6,244,660 B1 * | 6/2001 | Yoshimatsu | .............. | 297/344.1 |
| 6,688,667 B2 * | 2/2004 | Nishimoto et al. | ....... | 296/65.15 |
| 7,303,223 B2 * | 12/2007 | Nakamura et al. | ....... | 296/65.15 |
| 7,325,851 B2 * | 2/2008 | Ito et al. | .................. | 296/65.13 |
| 7,422,186 B2 * | 9/2008 | Kropfreiter et al. | ......... | 248/429 |
| 2003/0168566 A1 * | 9/2003 | Ito et al. | ..................... | 248/429 |

FOREIGN PATENT DOCUMENTS

| | | |
|---|---|---|
| JP | 11-115570 A | 4/1999 |
| JP | 2000-343899 | 12/2000 |

* cited by examiner

*Primary Examiner*—J. Allen Shriver
*Assistant Examiner*—Steven Marsh
(74) *Attorney, Agent, or Firm*—Hiroe & Associates; Taras P. Bemko

(57) ABSTRACT

An object of the invention is to provide a seat rail apparatus, which is capable of locking/unlocking forward/backward sliding of a seat for vehicle in a stepless manner with a simple structure, at an inexpensive cost. A brake disk 51 is attached to the front end of a slide screw 5, which is screwed with a nut 4 disposed within a lower rail 2 and an upper rail 3. A lock mechanism 6 comprises rollers 63 and 64, springs 65 for imparting a force to the rollers in the peripheral direction and a supporting member 61 disposed with the rollers and the springs therein. The springs 65 impart a force to the brake disk 51 and the supporting member 61 to bring the rollers 63 and 64 into a friction engagement; thus the rotation of the slide screw 5 can be locked. Owing to first and second engagement plates 81 and 82, the rollers 63 and 64 are caused to roll against the force imparted by the springs 65, and are released from the friction engagement; thus the slide screw 5 can be unlocked.

5 Claims, 8 Drawing Sheets

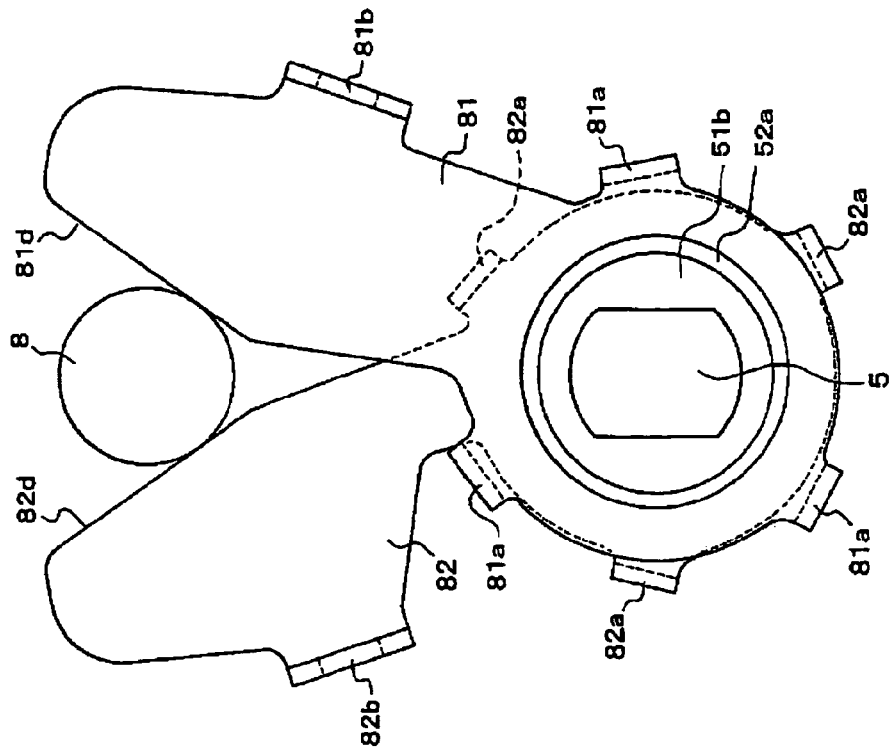
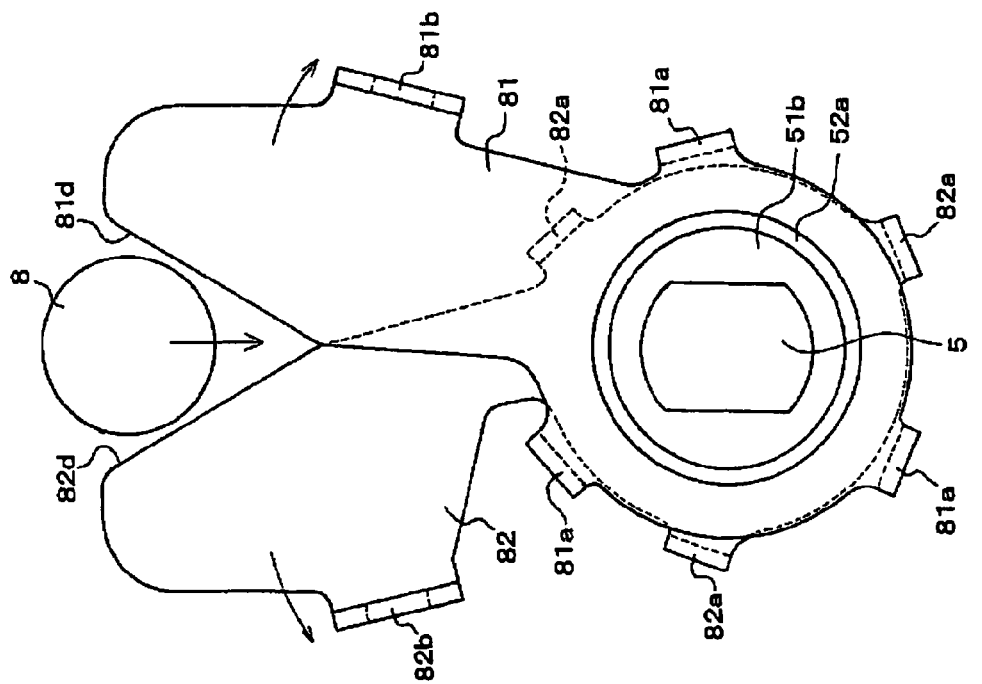

SEAT RAIL APPARATUS

TECHNICAL FIELD OF THE INVENTION

The present invention relates to a seat rail apparatus, which is attached to a seat for vehicle or the like for adjusting forward/backward position of the seat, particularly to a seat rail apparatus capable of adjusting the forward/backward position of the seat in a stepless manner.

BACKGROUND ART

In many seats for vehicle, a various angular and positional adjusting mechanisms are provided in order to fit with the respective figure and driving posture of sitting passengers. Particularly, a seat rail apparatus allowing a driver to adjust the forward/backward position of the seat to an optimum point for operating the pedal, is the most basic seat adjusting mechanism, and are mounted on almost driver's seats (and passenger seats) of vehicles.

In such seat rail apparatus, a power driven type, which is driven by the power of an electric motor, and a manual type, which requires manual operation by a passenger seating thereon, are available. Particularly, compared to the powered type, the manual type seat rail apparatus has the following advantages; i.e., because of simple structure, low risk of failure, light in weight and low in manufacturing cost, many vehicles adopt manual type seat rail apparatus.

Conventionally, as the seat rail apparatus of the manual type, the following type has been often adopted. That is, an upper rail fixed to the seat cushion side and a lower rail member fixed to the floor face side of a body of the vehicle are provided; and an engagement section having a "saw teeth-like" configuration is provided in the longitudinal direction of the upper rail, and an engagement member capable of arbitrarily engaging with and disengaging from the engagement section is provided to the lower rail member side; thus the locking is achieved in a stepless manner.

On the other hand, recently, there has been proposed the following system. That is, a "screw (shaft)" and a "nut", which have a lead angle larger than the angle of friction respectively, are disposed between an upper rail and a lower rail members, and when a passenger applies a load to a seat in the forward/backward direction in the unlocked state, the seat can be slid forward/backward. According to the seat rail apparatus of such system, the rotation of the screw can be arbitrarily locked and the forward/backward position of seat for vehicle is adjustable in a stepless manner accordingly. Such seat rail apparatus are disclosed in the patent document 1 and patent document 2.

The seat rail apparatus set forth in the Japanese Laid-Open Patent Application 11-115570/1999 (patent document 1) is provided with an inertia member, which rotates integrally with a nut, at the substantially central portion of the nut provided within the seat rail apparatus, and a lock mechanism capable of locking the rotation of the nut via the inertia member on the lower face of the lower rail member. The lock mechanism has a locking member and is arranged so that a lock pin protruding on an upper part of the locking member is brought into a friction engagement with the inertia member through the lower rail member; and thus the rotation of the inertia member is locked at an arbitrary position. Therefore, it is arranged so that, when the rotation of the inertia member is locked, the rotation of the nut, which integrally rotates with the inertia member, is also locked; and thus, the slide of the seat rail is fixed at an arbitrarily position.

Also, the seat rail apparatus set forth in the patent document 1 is provided with an emergency lock for preventing the seat from moving in the forward/backward direction when an excessive impact load is applied to the vehicle in a state the lock pin is disengaged from the inertia member (in a state the seat rail is unlocked). The emergency lock is arranged so that, when a screw rotates exceeding a predetermined value, a roller is expanded, and the roller is sandwiched in a narrow portion formed between a roller guide and the nut, and the rotation of the nut can be locked by means of the friction engagement with the roller; thus the seat rail is locked.

The emergency lock is a mechanism, which locks the rotation of the screw only in one direction of clockwise or counterclockwise. Therefore, in order to cope with any case of collision at the front or back, the lock mechanisms are provided at the front and back of the nut. When the emergency lock is functioned, a passenger operates to apply a load via the seat in the direction opposite to the load applied to the upper rail member; then, the nut rotates in the opposite direction and the roller is pulled out from the narrow portion; and thereby the lock is released.

In the seat rail apparatus set forth in the Japanese Laid-Open Patent Application 2000-343989/2000 (patent document 2), the front-end portion of a screw is coupled with a lock mechanism provided to an upper rail member. In this seat rail apparatus, the screw provided with a brake ring at the front end thereof is coupled with the lock mechanism having a locking member and a brake drum attached to an end portion of the upper rail member, and it is arranged so that, when a lock pin provided to the locking member makes a friction engagement with the brake ring, the rotation of the screw is locked.

According to the seat rail apparatus set forth in the patent document 1 and the patent document 2, since the lead angle of the nut and the screw is formed larger than the angle of friction, when a passenger applies a force to the seat in the forward/backward direction, the screw rotates and the seat can be slid. And only by locking the rotation of the screw, the seat can be fixed at an appropriate position; thus, "slide and lock in a stepless manner" is achieved.

However, there is a disadvantage in the seat rail apparatus set forth in the patent document 1 and the patent document 2 such that, since an arrangement to lock the rotation of the screw by means of the friction between the lock pin and the brake ring or the inertia member is employed, a large load accts on the respective members when locking the rotation of the screw and a play is easily generated.

Particularly, the emergency lock mechanism disclosed in the patent document 1 is a mechanism such that the screw is rotated with a load larger than a predetermined value, which is capable of locking only the rotation in one direction; i.e., clockwise or counterclockwise direction. To cope with the case where a load larger than the predetermined value is applied due to a collision at the front/back, the emergency lock mechanism has to be provided at the both sides of the nut to cope with the cases of collision from the respective directions. When such arrangement is adopted, the apparatus itself becomes larger in size, the number of the component parts becomes larger, and further, the structure thereof becomes complicated resulting in a disadvantage in the aspect of manufacturing cost and efficiency.

Also, when the emergency lock disclosed in the patent document 1 has functioned, in order to release the emergency lock, a passenger has to operate to apply a load in the direction opposite to the direction of the applied load. Therefore, there is a disadvantage such that, when the passenger operates the emergency lock erroneously, the emergency lock cannot be easily unlocked. It is required that the interior components of vehicle naturally guide a passenger to a proper operation without reading user's manual. The present invention has been proposed to solve the above problems, and an object thereof is as described below.

[Patent document 1] Japanese Laid-Open Patent Application 11-115570/1999

[Patent document 2] Japanese Laid-Open Patent Application 2000-343989/2000

DISCLOSURE OF THE INVENTION

Problem to be Solved by the Invention

An object of the present invention is to provide a seat rail apparatus, which is capable of locking/unlocking forward/backward sliding of a seat for vehicle in a stepless manner with a simple structure, at an inexpensive cost.

Means for Solving the Problem

To solve the above problems, the present invention adopts the following arrangements.

A first aspect of the invention has the following technical characteristics; i.e., a seat rail apparatus, comprising:

a lower rail member fixed to a floor face of a vehicle and an upper rail member fixed to a seat for vehicle slidably with respect to the lower rail member;

a screw disposed along the longitudinal direction of either one of the lower rail member and the upper rail member having a lead angle formed larger than the self-locking angle of friction;

a nut fixed to the other one of the lower rail member or the upper rail member and screwed with the screw; and a lock mechanism capable of arbitrarily locking the rotation of the screw provided to the rail member disposed with the screw;

the seat rail apparatus being capable of, when the lock mechanism locks the rotation of the screw, holding the upper rail member at an arbitrary position to restrict the forward/backward sliding with respect to the lower rail member, wherein the screw is provided with a brake disk on the same axis thereof, the lock mechanism is provided with a rolling member, a force-imparting member for imparting a force to the rolling member in a specific direction and a supporting member for holding the same, the rolling member and the force-imparting member are disposed on the periphery of the brake disk, the force-imparting member imparts the force to the rolling member in the periphery direction, and the supporting member is disposed with the force-imparting member and the rolling member therein, the rolling member, being imparted with the force by the force-imparting member, is sandwiched between the brake disk and the supporting member and engaged with friction therewith, and by means of the friction engagement, the rotation of the screw can be locked, and in order to lock the rotation of the brake disk in the clockwise/counterclockwise direction, at least one rolling member is disposed for each direction, the lock mechanism is provided with an operating member for releasing the rolling member from the friction engagement to release the lock of the screw.

A second aspect of the invention is the seat rail apparatus according to the first aspect of the invention, wherein the operating member includes first and second engagement plates disposed on the identical axle, an operation cam and an operation lever; the first and second engagement plates are formed with operating pieces and an engagement projection respectively and the operation cam is formed with first and second contact portions, the contact portion engages with the engagement projection and the operating pieces come into contact with the rolling member, when the operation lever is operated, the operation cam rotates and the first contact portion comes into contact with the engagement projection of the first engagement plate first to rotate the same clockwise, and then, when the operation cam further rotates, the second contact portion comes into contact with the engagement projection of the second engagement plate to rotate the same counterclockwise, thereby the operating pieces cause the rolling member to roll in the direction against the force imparted by the force imparting member.

A third aspect of the invention is the seat rail apparatus according to the first aspect of the invention, wherein the operating member includes first and second engagement plates disposed on the identical axle and a operation lever, and the first and second engagement plate are formed with operating pieces and a contact piece respectively, the peripheral side face of the operation lever engages with the contact piece, and the operating pieces come into contact with the rolling member, when the operation lever is operated, the operation lever moves vertically, the peripheral side face of the operation lever comes into contact with the contact piece of the first engagement plate to rotate the same clockwise and simultaneously comes into contact with the contact piece of the second engagement plate to rotate the same counterclockwise, thereby the operating pieces cause the rolling member to roll in the direction against the force imparted by the force imparting member.

Further, a fourth aspect of the invention is the seat rail apparatus according to any of the first to third aspects of the invention, wherein a plurality of the rolling members is disposed on the periphery around the rotation shaft of the screw to lock the rotation of the brake disk in the clockwise and counterclockwise directions, and a plurality of the force imparting members and operating pieces of the first and second engagement plates are also provided corresponding to the number of the rolling members, the plurality of the rolling members, which neighbors to each other and rotates in the direction different from each other, are caused to roll simultaneously by the operating pieces.

A fifth aspect of the invention is the seat rail apparatus according to the fourth aspect of the invention, wherein, including the rolling member, the force imparting member, and the operating pieces of the first and second engagement plate, which are capable of causing the rolling member to roll, as a set, one set thereof is disposed on the periphery of the brake disk at the upper portion side of the supporting member, and two sets thereof are disposed at the lower portion sides of the supporting member in a substantially triangle configuration having the one set at the upper portion side of the supporting member as the apex thereof.

Furthermore, the sixth aspect of the invention is the seat rail apparatus according to any of the first to fifth aspects of the invention, wherein the lock mechanism is attached to the front end portion of the upper rail member, the brake disk is attached to front end portion of the screw and the front end portion of the screw is pivoted by the lock mechanism.

Advantage of the Invention

First of all, according to the seat rail apparatus in accordance with the first aspect of the invention, in the screw and the nut, which are screwed with each other and the lead angle thereof is formed larger than the self-locking angle of friction respectively. The nut is fixed to the lower rail member, and the screw is rotatably pivoted by the upper rail member. The seat rail apparatus includes the brake disk attached to the screw coaxially with the rotation shaft, the rolling members and the force imparting members and the supporting member provided in the lock mechanism. When the force imparting members bring the rolling members into friction engagement with the brake disk and the supporting member, the rotation of the brake disk is locked. When the rolling members are brought into a friction engagement with the brake disk and the supporting member at an arbitrary position, the rotation of the screw can be locked in a stepless manner. When the rotation of the screw can be reliably locked, the movement of the upper rail member also can be locked with respect to the lower rail member.

In order to lock the rotation of the brake disk in the both directions; i.e., clockwise and counterclockwise, the rolling members are provided at least one for each rotation direction. Therefore, the rotation of the screw in the both directions of clockwise and counterclockwise directions can be locked with one lock mechanism. The friction engagement of the rolling members can be easily unlocked by using the operating member. Accordingly, the number of component parts can be reduced and the apparatus can be constructed thinner than the conventional apparatus.

Secondly, in addition to the advantages of the first aspect, according to the seat rail apparatus in accordance with the second aspect of the invention, the operating member includes the first and second engagement plates, the operation cam and the operation lever. The operating member is arranged so that, when the operation lever is operated, the operation cam rotates and the contact portion formed on the operation cam is brought into contact with the engagement projection formed on the engagement plate, and the first engagement plate, which is rotated in the clockwise direction, rotates prior to the second engagement plate, which is rotated in the counterclockwise direction. Therefore, in order to unlock the screw, when the rolling members are released from the friction engagement between the brake disk and the supporting member, the first and second engagement plates rotate in the directions opposite to each other, and the operating pieces formed on the engagement plate cause the rolling members to roll; thereby, friction engagement of one direction in the clockwise direction or counterclockwise direction is released first. Then, slightly after that, the other friction engagement is released. Accordingly, when operating the operation lever and the operation cam, since the load is not entirely applied but partially applied on the unlocking operation. Accordingly, such advantage as satisfactory operation performance is obtained. Also, since the first and second engagement plates, which rotate to the directions different from each other, can be operated simultaneously with one operation lever and the operation cams, satisfactory operation performance is obtained and the number of component parts can be reduced, and accordingly the apparatus itself can be constructed in a small size.

Further, in addition to the advantages of the first aspect, according to the seat rail apparatus in accordance with the third aspect of the invention, the operating member includes the first and second engagement plates and the operation lever. When the operation lever is operated, the operation lever is moved vertically, the peripheral side face of the operation lever comes into contact with the contact piece of the first engagement plate and causes the same to rotate in the clockwise direction; and at the same time, the peripheral side face of the operation lever comes into contact with the contact piece of the second engagement plate and causes the same to rotate in the counterclockwise direction. Thereby, the operating pieces cause the rolling members to roll in the directions against the force imparted by the force-imparting members respectively. Therefore, since the first and second engagement plates, which rotate to the directions different from each other, can be operated simultaneously with one operation lever and the operation cams, satisfactory operation performance is obtained, and the number of component parts can be reduced. Accordingly, the apparatus itself can be constructed in a further small size.

Further, in addition to the advantages of any of the first to third aspects, according to the seat rail apparatus in accordance with the fourth aspect of the invention, since the plurality of rolling members are disposed for each of the clockwise and counterclockwise rotation directions of the brake disk, the screw can be reliably locked at an arbitrarily position. Furthermore, owing to the plurality of operating pieces formed on the first and second engagement plates of the operating member, the plurality of rolling members locking the rotation in the respective rotation directions can be caused to roll simultaneously; thus the lock can be efficiently released.

In addition to the advantages of the fourth aspect, according to the seat rail apparatus in accordance with the fifth aspect of the invention, as a set including a rolling members, the force imparting member and the operating pieces, one set thereof is disposed at the upper portion side of the supporting member; and two sets thereof are disposed at the lower portion side of the supporting member in a substantially triangle shape with the set at the upper portion side as the apex thereof. Since the two sets have the same height position as that of the brake disk, the lock mechanism is prevented from becoming large in the height direction, and since the friction force acts uniformly on the brake disk, the rotation can be reliably locked.

And finally, in addition to the advantages of any of the first to fifth aspects, according to the seat rail apparatus in accordance with the sixth aspect of the invention, the lock mechanism and the brake disk for locking the rotation of the screw are attached to the front end of the upper rail member and the front end of the screw. Therefore, pre-assembly or post assembly of the rail apparatus is possible. Accordingly, the following advantages can be obtained; i.e., the time for assembling the rail apparatus can be saved and the cost therefor also can be reduced. Further, since the front-end portion of the screw is pivoted by the lock mechanism, the disposition of the brake disk within the supporting member is fixed, and the disposition with respect to the rolling members is reliably secured. Thus, the friction force acts uniformly on the rolling members resulting in an increased locking accuracy.

BEST MODE FOR CARRYING OUT THE INVENTION

Hereinafter, embodiments 1 to 3 of a seat rail apparatus in accordance with the invention will be described. As for the embodiments 2 and 3, description will be given particularly about the arrangements different from those in the first embodiment, and the redundant description thereof will be omitted.

First Embodiment

FIG. 1 to FIG. 4 show a seat rail apparatus 1 in accordance with the first embodiment, which is, particularly, attached to a seat of a vehicle for allowing a seat to be adjusted in the forward/backward direction in a stepless manner.

The seat rail apparatus 1 in accordance with the embodiment includes a "lower rail member 2", an "upper rail member 3", a "nut 4", a "slide screw 5", a "lock mechanism 6" and an "operating member". Descriptions on each component element will be made below.

First of all, the "lower rail member 2" is fixed to a floor face of a vehicle and serves as a base of the seat rail apparatus. The "upper rail member 3" is fixed to a seat for vehicle and slidably engaged with the lower rail member 2. Each of the rail members 2 and 3 has to ensure a specific strength enough to support the weight of the seat and a passenger as well as to support a large load generated under an emergent situation such as collision of the vehicle. In this embodiment, each of the rail members 2 and 3 is formed of a steel plate pressed into a substantially U-like shape in cross section and engaged slidably with each other.

The "screw 5" is a bolt-like member having a lead angle larger than a self-locking angle of friction, which is disposed along the longitudinal direction of either the lower rail member 2 or the upper rail member 3. In this embodiment, the screw 5 is disposed along the longitudinal direction of the upper rail member 3. The rear end of the slide screw 5 is rotatably supported by a rear bearing 31 attached to the upper rail member 3. The front end of the slide screw 5 is rotatably supported by a lock mechanism 6 (which will be described later), which also serves as a front bearing. The front end of the slide screw 5 penetrates the lock mechanism 6 and a cover 52, and a brake disk 51 and a fixing nut 53 are attached thereto. The cover 52 is formed with a projection 52a, and a shaft portion 51b formed at the front-end side of the brake disk 51 is rotatably inserted therethrough, and a washer and the fixing nut 53 are attached thereto.

The "nut 4" is screwed with the screw 5 and is fixed to either the lower rail member or the upper rail member. Since the nut 4 is screwed with the screw 5, the nut 4 also has to have the lead angle larger than the self-locking angle of friction same as the screw 5. In this embodiment, the nut 4 is provided to the lower rail member 2 in the vicinity of the central area thereof being interposed by a nut holder 41. The slide screw 5 screwed with the nut 4 is rotatably disposed in the upper rail member 3.

In such arrangement as described above, in an unlock state with the lock mechanism 6 (which will be described later), when a passenger apply a load to the seat mounted on the upper rail member 3 in the forward/backward direction, the slide screw 5 screwed with the nut 4 is driven to rotate, and the upper rail member 3 slides to change its position forward/backward with respect to the lower rail member 2. And when the lock mechanism 6 is functioned to lock, the upper rail member 3 is held (maintained) not to slide with respect to the lower rail member 2.

Next, the "lock mechanism 6" will be described. The lock mechanism 6 is provided to the rail member (2 or 3) to which the screw 5 is disposed for arbitrarily locking the rotation of the screw 5. The lock mechanism 6 comprises a "rolling member", a "force imparting member" and a "supporting member 61".

In the supporting member 61 in this embodiment, a disposition section 61e is formed, and in the disposition section 61e, the brake disk 51 attached to the front end of the slide screw 5 is disposed. Between the periphery of the brake disk 51 and the supporting member 61, a space having a wide portion and a narrow portion is formed; and in the space, leftward-rolling rollers 63 and rightward-rolling rollers 64 are disposed as the "rolling member". Springs 65 as the "force imparting member" impart a force to the leftward-rolling rollers 63 and the rightward-rolling rollers 64 respectively to push the rollers from the wide portion toward the narrow portion in the space. By arranging as described above, the rollers 63, 64 are pressed between the supporting member 61 and the brake disk 51. Accordingly, a friction is generated between the supporting member 61 and the brake disk 51 being interposed by the rollers 63, 64, and the rotation of the brake disk 51 is locked. That is, since the screw 5 connected to the brake disk 51 cannot be rotated unless the force of the springs 65 is released, the upper rail member 3 cannot be slid forward/backward.

A set of the rollers 63, 64 and the springs 65 is disposed at the upper portion 61a side of the supporting member 61, and at the both sides thereof, the other rollers 63, 64 and the springs 65 are disposed in a substantially triangle shape at approximately 120° intervals as shown in FIG. 3. That is, since the friction force acts on the brake disk 51 uniformly from three directions, the rotation of the disk 51 can be reliably locked. Also, since the rollers 63, 64 and the springs 65 are not disposed in the lower portion of the lower rail member 2, the height dimension of lock mechanism 6 can be arranged compactly. Further, in this embodiment, by utilizing a space at the upper portion 61a side, one leftward-rolling roller 63 is added to increase the locking capacity with respect to the forward sliding.

Furthermore, according to the arrangement of this embodiment, since the brake disk 51 attached to the front-end portion of the slide screw 5 is fixed to the supporting member 61 as the axle as shown in FIG. 2, the position of the brake disk 51 is secured thereby. Accordingly, since the disposition of the rollers 63, 64 with respect to the brake disk 51 is reliably secured, the friction force from the rollers 63, 64 uniformly acts thereon; and thus, a highly precise locking can be achieved.

The disposition section 61e is covered with the cover 52 so that the rollers 63, 64 and the springs 65 are not disengaged to the outside. The cover 52 is fitted in a step 61c formed in the supporting member 61 so that the rotation force of the brake disk 51 does not act thereon.

In this embodiment, a mounting bracket 32 for mounting the lock mechanism 6 is attached to the front end of the upper rail member 3 as shown in FIG. 1 and FIG. 2. The lock mechanism 6 is fixed to the mounting bracket 32 by overlapping set-holes 61d, which are drilled in the supporting member 61, with set-holes, which are drilled in the mounting bracket 32, and inserting a pin respectively. The supporting member 61 includes an upper portion 61a and a lower portion 61b. The upper portion 61a extends upward, and the lower portion 61b extends in the lateral directions. The lower portion 61b is engaged with the lower rail member 2 so as to be movable therein. As the set-holes 61d, one set-hole is drilled in the upper portion 61a and two set-holes are drilled in the right and left lower portions 61b respectively in the supporting member 61.

In the supporting member 61, the lower portion 61b thereof is arranged to be movable inside the lower rail member 2. By forming the lower portion 61b in the substantially same shape as that in section of the lower rail member 2, when the upper rail member 3 is engaged with the lower rail member 2, the lower portion 61b of the supporting member 61 is also engaged with the lower rail member 2. Therefore, in a state that the supporting member 61 is structured to be inserted inside the lower rail member 2, even when an excessive load acts on the seat rail apparatus 1 at a collision or the like of the vehicle from the back, the upper rail member 3 can be prevented from being disengaged (broken off) from the lower rail member 2.

When the rear bearing 31, which is attached to the upper rail member 3 to support the rear end of the slide screw 5, is formed in the same shape as that of the supporting member 61, the front and rear ends of the upper rail member 3 can be closed up, and the entire upper rail member 3 can be structured in a box-like shape. By constructing as described above, the seat rail apparatus 1 becomes extremely durable against the deformation or contortion due to the load, even when a load acts thereon at a collision, the upper rail member 3 can be prevented from being disengaged (broken off) from the lower rail member 2.

Next, the "operating member" will be described below. In this embodiment, the operating member is for releasing the friction engagement of the rolling members in the lock mechanism 6 to allow the screw 5 to rotate. The operating member includes a "first engagement plate 81", a "second engagement plate 82", an "operation cam 84" and an "operation lever 8". Particular arrangements of the above will be described below in detail.

As shown in FIG. 2 and FIG. 4, the first engagement plate 81 and the second engagement plate 82 are rotatably mounted on the projection 52a of the cover 52, which is attached to the lock mechanism 6. The first engagement plate 81 is formed with operating pieces 81a for causing the leftward-rolling rollers 63 to roll against the force imparted by the springs 65; and the second engagement plate 82 is formed with operating pieces 82a for causing the rightward-rolling rollers 64 to roll against the force imparted by the springs 65.

Also, each of the first engagement plate 81 and the second engagement plate 82 is formed with a spring mounting piece 81b, 82b, respectively, and to the spring mounting pieces 81b and 82b, a holding spring 83 is attached. Owing to this, it is arranged so that, in a state that the operation lever 8 is not operated (the rollers are not operated), the operating pieces 81a and 82a are held in a state being parted from each other (the first engagement plate 81 is held in the counterclockwise direction; and the second engagement plate 82 is held in the clockwise direction).

When a passenger operates the operation lever 8, the engagement plates 81 and 82 are made to rotate and the friction engagement of the rollers 63, 64 is released; and thereby the slide screw 5 is allowed to rotate via the brake disk 51. In this embodiment, on the periphery between the slide screw 5 and the supporting member 61, a plurality of balls 7 is interposed to allow the slide screw 5 to rotate more smoothly. In the backside of the brake disk 51 through which the slide screw 5 is inserted, an inner ring 54 is attached; and in the front portion of the inner ring 54, a ball bearing 54a is formed. At the backside of the brake disk 51, a ball bearing 51a is formed; and in the rear portion of the disposition section 61e of the supporting member 61, a ball bearing 61f is formed. Thus, the balls 7 are supported at three points of ball bearing 54a, ball bearing 51a and the ball bearing 61f to allow the balls to roll (refer to FIG. 4).

In this embodiment, the following arrangement is adopted. That is, the engagement plates 81 and 82 are rotatably attached to the projection 52a of the cover 52 so that the turning force of the brake disk 51 does not act on the engagement plates 81 and 82. However, the invention is not limited to the above. When an arrangement such that a bearing or the like interposed between the engagement plates 81 and 82 and the brake disk 51 is adopted, the projection does not have to be formed on the cover 52, the engagement plates 81 and 82 can be directly attached to the brake disk 51.

The operation cam 84 is attached to the mounting bracket 32 provided at the front end of the upper rail member 3. The mounting bracket 32 is formed with a cam mounting hole 32a, and the cam mounting hole 32a is provided with a set pin 33 having a large diameter portion, which has the identical dimension as the thickness of the supporting member 61 in the central portion thereof, and the operation cam 84 is rotatably attached to the set pin 33. The operation cam 84 abuts on the operation lever 8. When the operation lever 8 is operated, the operation cam 84 rotates simultaneously; thus, the operation cam 84 operates the first engagement plate 81 and the second engagement plate 82.

More particularly, when the operation cam 84 rotates, a first contact portion 84a formed on the operation cam 84 is first brought into contact with engagement projection 81c formed on the first engagement plate 81 and causes the first engagement plate 81 to rotate. After that, when the operation cam 84 is further rotated, a second contact portion 84b formed on the operation cam 84 is brought into contact with an engagement projection 82c formed on the second engagement plate 82; thus the second engagement plate 82 is rotated.

Next, the operation of the arrangement of the seat rail apparatus 1 in accordance with the embodiment will be described.

In an ordinary state where the operation lever 8 is not being operated, the springs 65 as the force-imparting member impart a force to the leftward-rolling rollers 63 in the counterclockwise direction; and to the rightward-rolling rollers 64 in the clockwise direction. Accordingly, the rollers 63 and 64 are sandwiched between the brake disk 51 and the supporting member 61 and brought into a friction engagement therewith and the rotation of the brake disk 51 is locked. Since the brake disk 51 is integrally attached to the front end of the slide screw 5, the brake disk 51 locks the rotation and thus the rotation of the slide screw 5 is also locked. Accordingly, the position of the upper rail member 3 with respect to the lower rail member 2 is not changed; thus, the upper rail member 3 and the seat provided thereon are held at the present position.

To change the forward/backward position of the seat, at the same time when the operation lever 8 is operated, the operation cam 84 rotates, and the first contact portion 84a of the operation cam 84 causes the first engagement plate 81 to rotate; and the second contact portion 84b causes the second engagement plate 82 to rotate. Then, the operating pieces 81a on the engagement plate 81 causes the leftward-rolling rollers 63 to roll against the force imparted by the springs 65; and the operating pieces 82a on the engagement plate 82 causes the rightward-rolling rollers 64 to roll against the force imparted by the springs 65. As a result, since the friction engagement among the rollers 63 and 64, the brake disk 51 and the supporting member 61 is released, the slide screw 5 becomes rotatable freely.

Here, the lead angle of the nut 4 and the slide screw 5, which are screwed with each other, is formed larger than the angle of friction. Therefore, for example, when a passenger applies a load to the upper rail member 3 in the forward/backward direction via the seat, the slide screw 5 rotates and the upper rail member 3 moves in the forward/backward direction with respect to the lower rail member 2. When the passenger releases the operation lever 8 at a desired position, the first and second engagement plates 81 and 82 are caused to rotate by the force imparted by the holding spring 83, and the operating pieces 81a and 82a of the engagement plates are departed away from the leftward and rightward-rolling rollers 63 and 64 and rotated in the peripheral direction by the force imparted by the springs 65 as the force imparting member.

As a result, the leftward and rightward-rolling rollers 63 and 64 are sandwiched between the brake disk 51 and the supporting member 61 and brought into a friction engagement therewith; and thereby the rotation of the slide screw 5 is locked and the upper rail member 3 is held at that position.

Second Embodiment

FIGS. 5 and 6 illustrate a seat rail apparatus 1 in accordance with a second embodiment. FIG. 5 is a figure corresponding to FIG. 2 showing the seat rail apparatus 1 in the first embodiment.

The arrangement of the "operating member" of the seat rail apparatus 1 in accordance with the second embodiment is different from that in accordance with the first embodiment. In particular, as shown in FIG. 5, the operating member in accordance with the second embodiment comprises a "first engagement plate 81", a "second engagement plate 82" and an "operation lever 8". According to the second embodiment, as shown in FIG. 6(a), the first engagement plate 81 and the second engagement plate 82 are arranged in a shape of "a pair of scissors". And the operation lever 8, which is rotatable in the vertical direction, is disposed between the front-end portions of the first engagement plate 81 and the second engagement plate 82. The end portion of the operation lever 8 is inserted through an elongation hole 32b drilled in the mounting bracket 32, and supported rotatably in the vertical direction by means of a supporting member (not shown).

That is, unlike the first embodiment, the second embodiment does not employ the "operation cam 84". When a passenger presses down the operation lever 8, the peripheral side face of the operation lever 8 enters between contact pieces 81d and 82d of the front-end portion of the first engagement plate 81 and the front-end portion of the second engagement plate 82 as shown in FIG. 6(b). Therefore, the space between the first engagement plate 81 and the second engagement plate 82 is expanded. Accordingly, the operating pieces 81a of the first engagement plate 81 cause the leftward-rolling rollers 63 to roll against the force imparted by the springs 65; and the operating pieces 82a of the second engagement plate 82 cause the rightward-rolling rollers 64 to roll against the force imparted by the springs 65. As a result, the friction engagement among the rollers 63 and 64, the brake disk 51 and the supporting member 61 is released and the slide screw 5 becomes rotatable freely. In the second embodiment, for the convenience of illustration, the leftward-rolling roller 63, which is additionally provided in the first embodiment, is omitted. Accompanying this, one of the operating pieces 81a and the springs 65 of the first engagement plate 81 are also omitted respectively. Since the other arrangements and operation are the same as those described in the first embodiment, the description therefor in this embodiment are omitted.

Third Embodiment

FIGS. 7 and 8 illustrate a seat rail apparatus 1 in accordance with a third embodiment. FIG. 7 is a figure corresponding to FIG. 2 showing the seat rail apparatus 1 in the first embodiment.

The arrangement of the "operating member" of the seat rail apparatus 1 in accordance with the third embodiment is different from that of the first embodiment. In particular, as shown in FIG. 7, the operating member in the third embodiment comprises a "first engagement plate 81", a "second engagement plate 82" and an "operation lever 8". According to the second embodiment, as shown in FIG. 8(a), the first engagement plate 81 and the second engagement plate 82 are arranged in a shape of "a pair of pliers". And the operation lever 8, which is rotatable in the vertical direction, is disposed between the front-end portions of the first engagement plate 81 and the second engagement plate 82. The end portion of the operation lever 8 is inserted through an elongation hole 32b drilled in the mounting bracket 32, and arranged rotatably in the vertical direction by means of a supporting member (not shown).

That is, unlike the first embodiment, the third embodiment does not employ the "operation cam 84". When a passenger pull up the operation lever 8, the peripheral side face of the operation lever 8 enters between a contact pieces 81d and 82d of the front end portion of the first engagement plate 81 and of the front end portion of the second engagement plate 82 as shown in FIG. 8(b). Therefore, the space between the first engagement plate 81 and the second engagement plate 82 is expanded. Accordingly, the operating pieces 81a of the first engagement plate 81 cause the leftward-rolling rollers 63 to roll against the force imparted by the springs 65; and the operating pieces 82a of the second engagement plate 82 cause the rightward-rolling rollers 64 to roll against the force imparted by the springs 65. As a result, since the friction engagement among the rollers 63 and 64, the brake disk 51 and the supporting member 61 is released and the slide screw 5 becomes rotatable freely. In the third embodiment, for the convenience of illustration, the leftward-rolling roller 63, which is additionally provided in the first embodiment, is omitted. Accompanying this, one of the operating pieces 81a and the springs 65 of the first engagement plate 81 are also omitted respectively. Also, since the other arrangements and operation are the same as those described in the first embodiment, the description therefor in this embodiment are omitted.

INDUSTRIAL APPLICABILITY

The seat rail apparatus in accordance with the present invention is applicable not only to seats for vehicle but also to rail apparatus including two members of an upper rail member and a lower rail member, which perform a relative movement with respect to each other.

In this invention, the upper rail member rotatably pivots the slide screw, and the nut is fixed to the lower rail member. However, the same advantage can be obtained by fixing the nut to the upper rail member, and the lower rail member pivots the slide screw.

BRIEF DESCRIPTION OF THE DRAWINGS

FIG. 6 are illustrations showing the operation of a first engagement plate 81 and a second engagement plate 82 provided to the lock mechanism 6 shown in FIG. 5.

Figure 1:
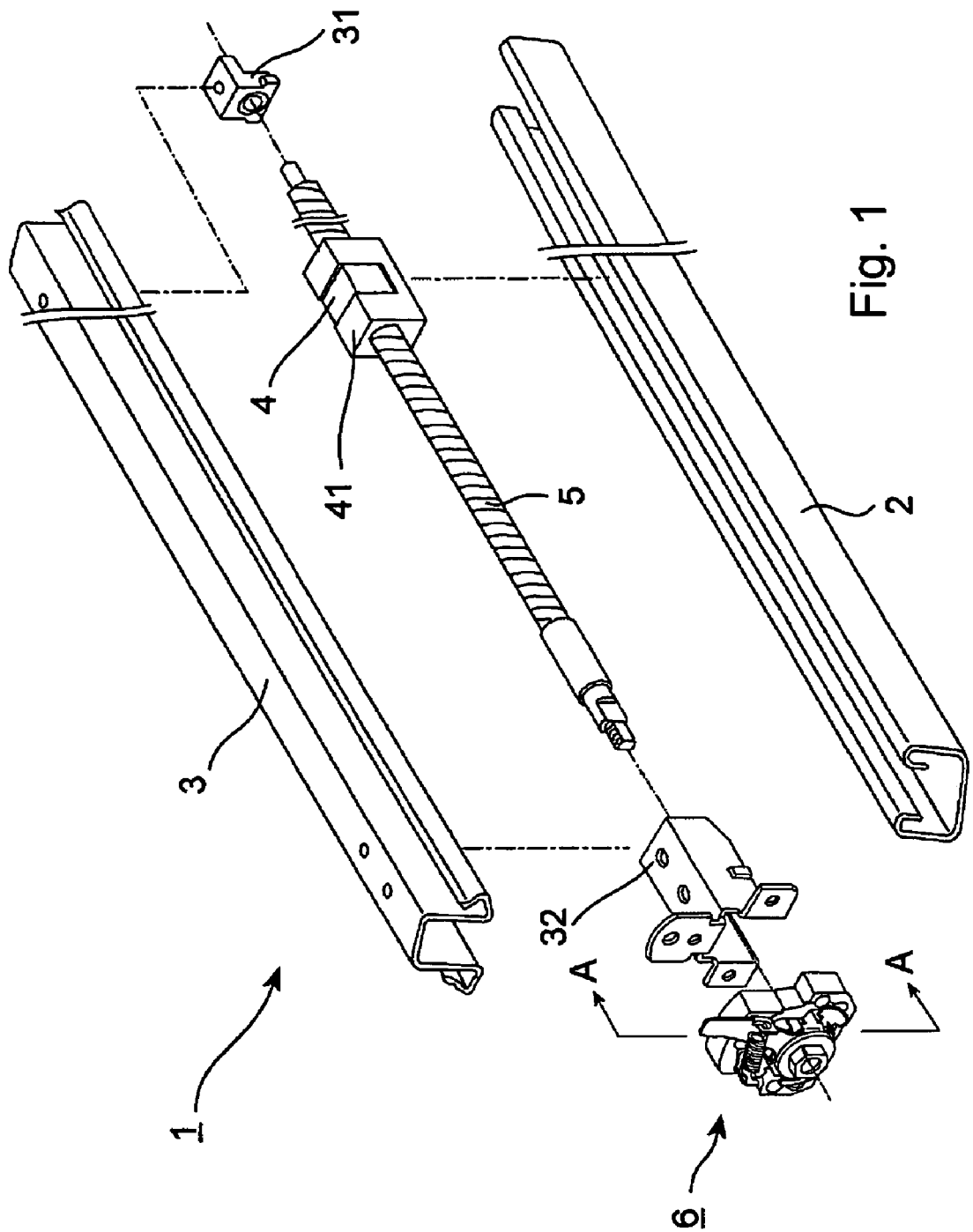
FIG. 1 is an exploded perspective illustration showing a part of a seat rail apparatus 1 in accordance with a first embodiment.
Figure 2:
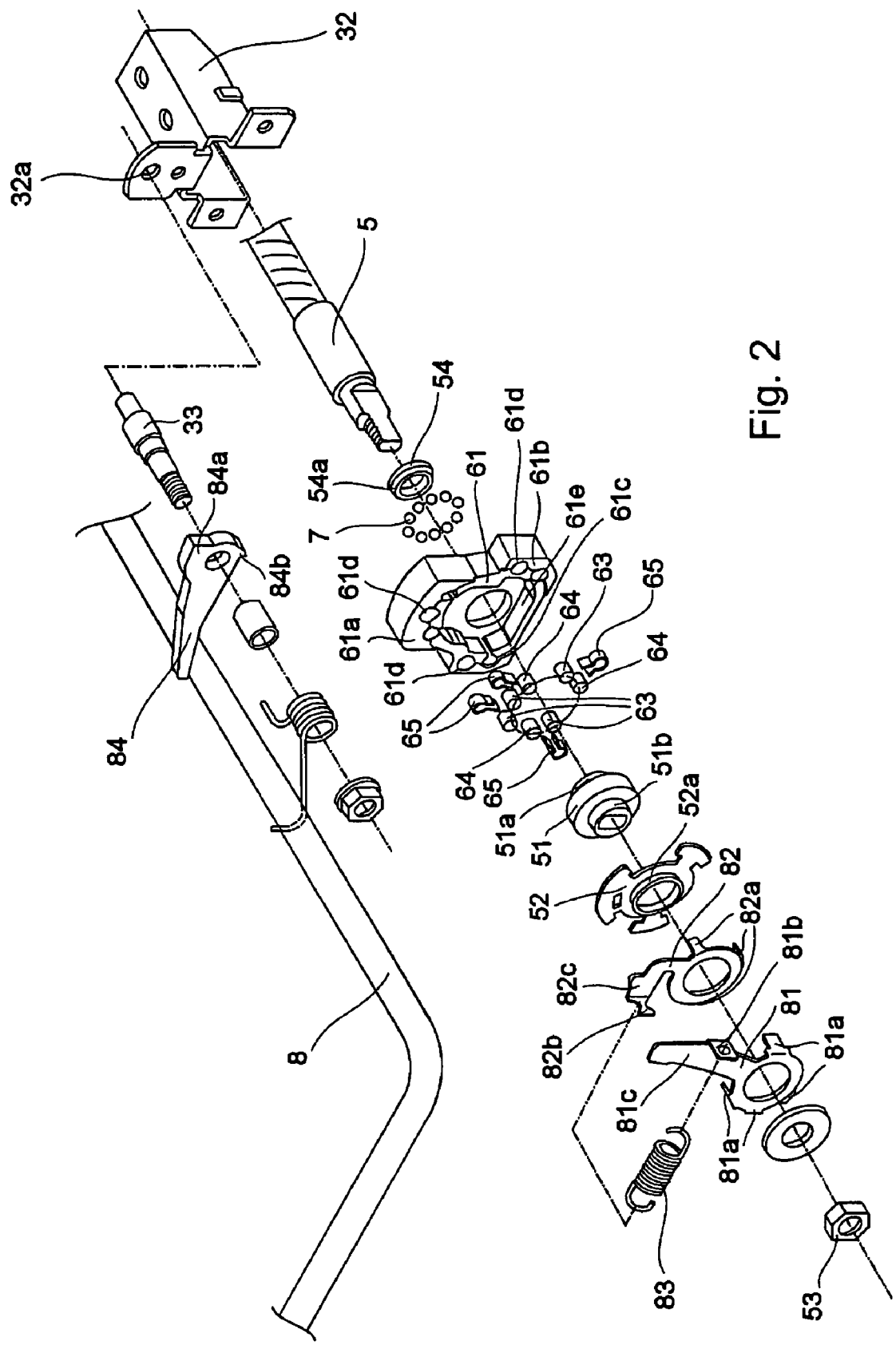
FIG. 2 is an exploded perspective illustration showing a lock mechanism 6 provided to the seat rail apparatus 1 shown in FIG. 1.
Figure 3:
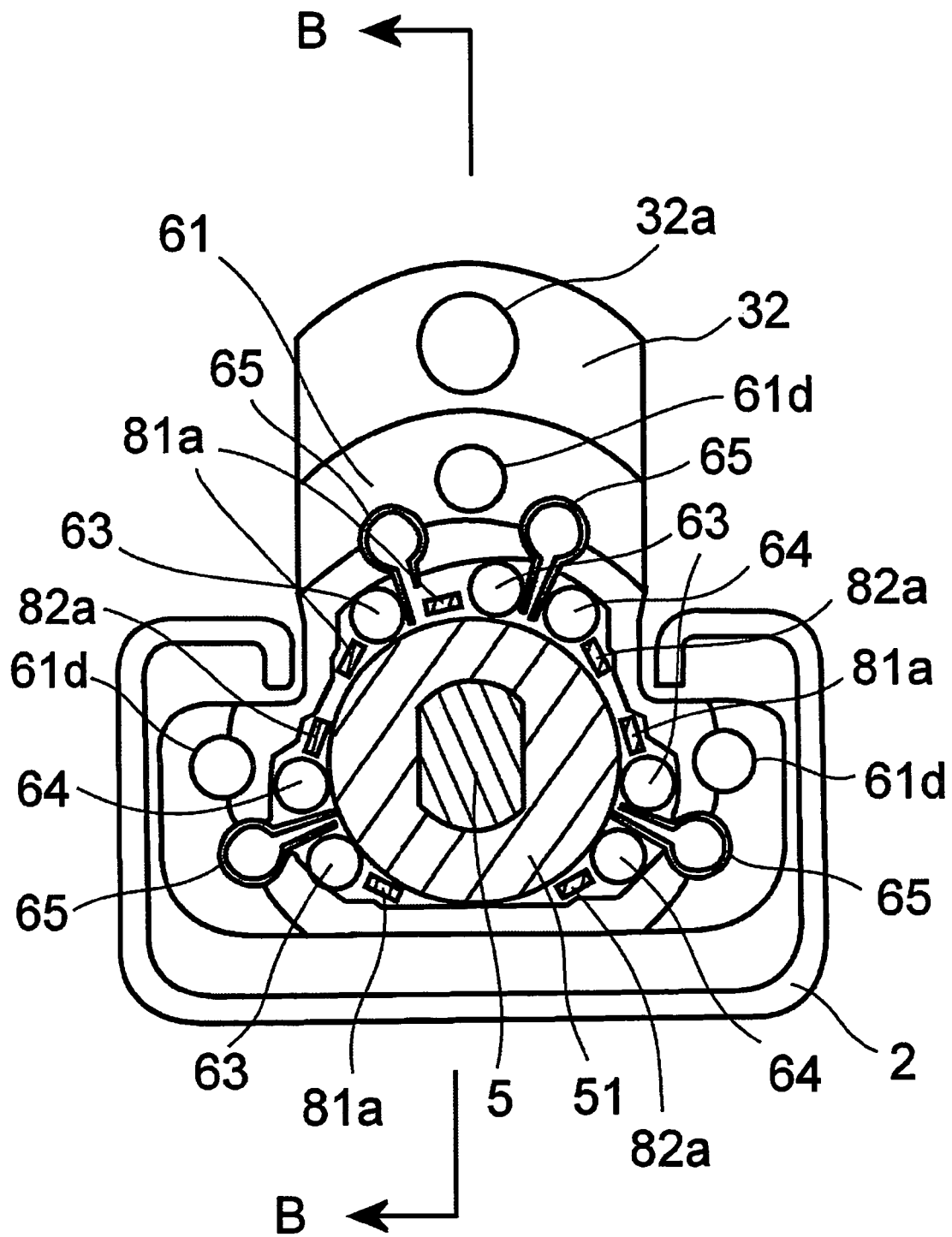
FIG. 3 is a cross sectional view of the lock mechanism 6 provided to the seat rail apparatus 1 shown in FIG. 1 taken along the line A-A.
Figure 4:
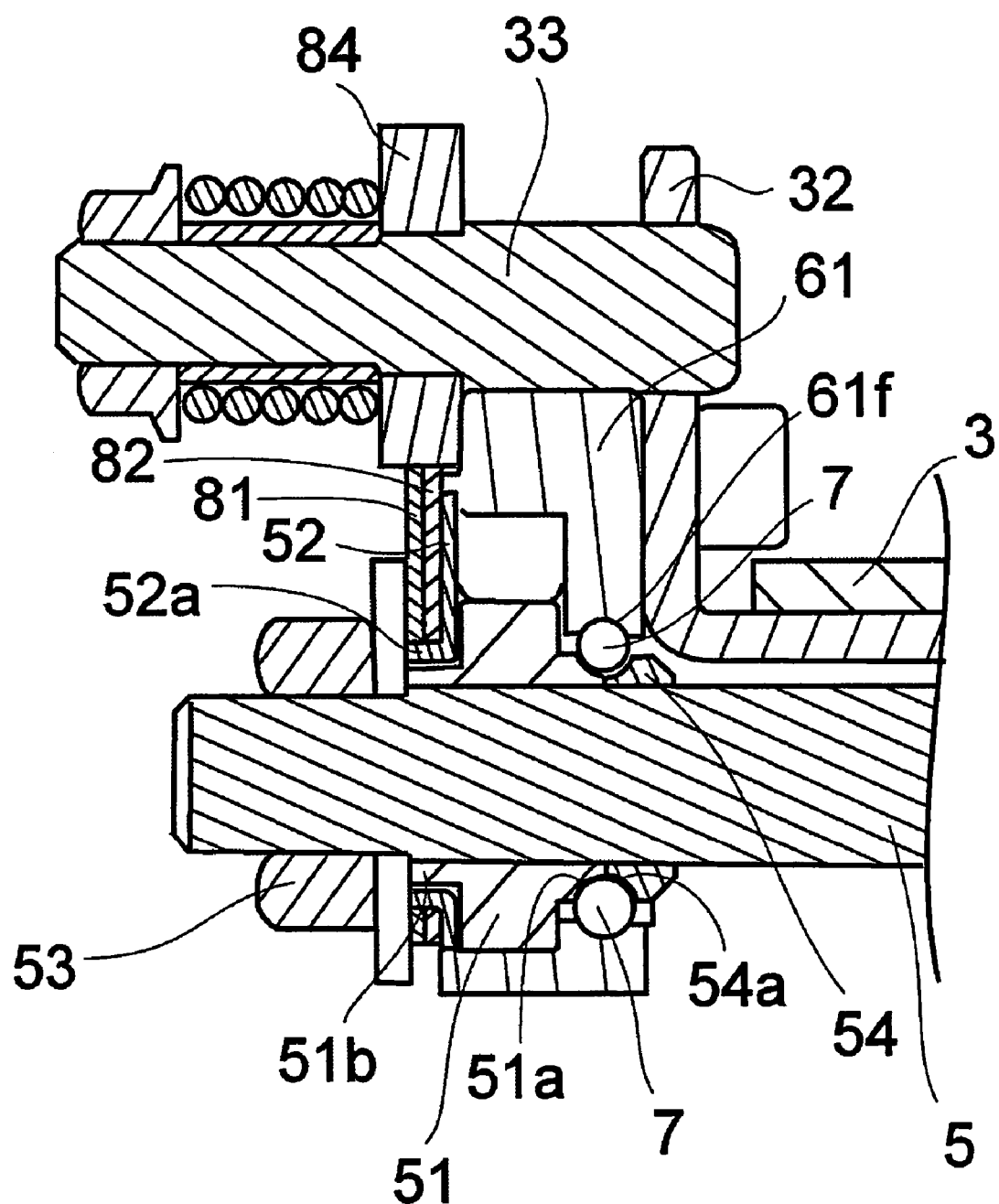
FIG. 4 is a sectional view of the lock mechanism 6 shown in FIG. 3 taken along the line B-B.
Figure 5:
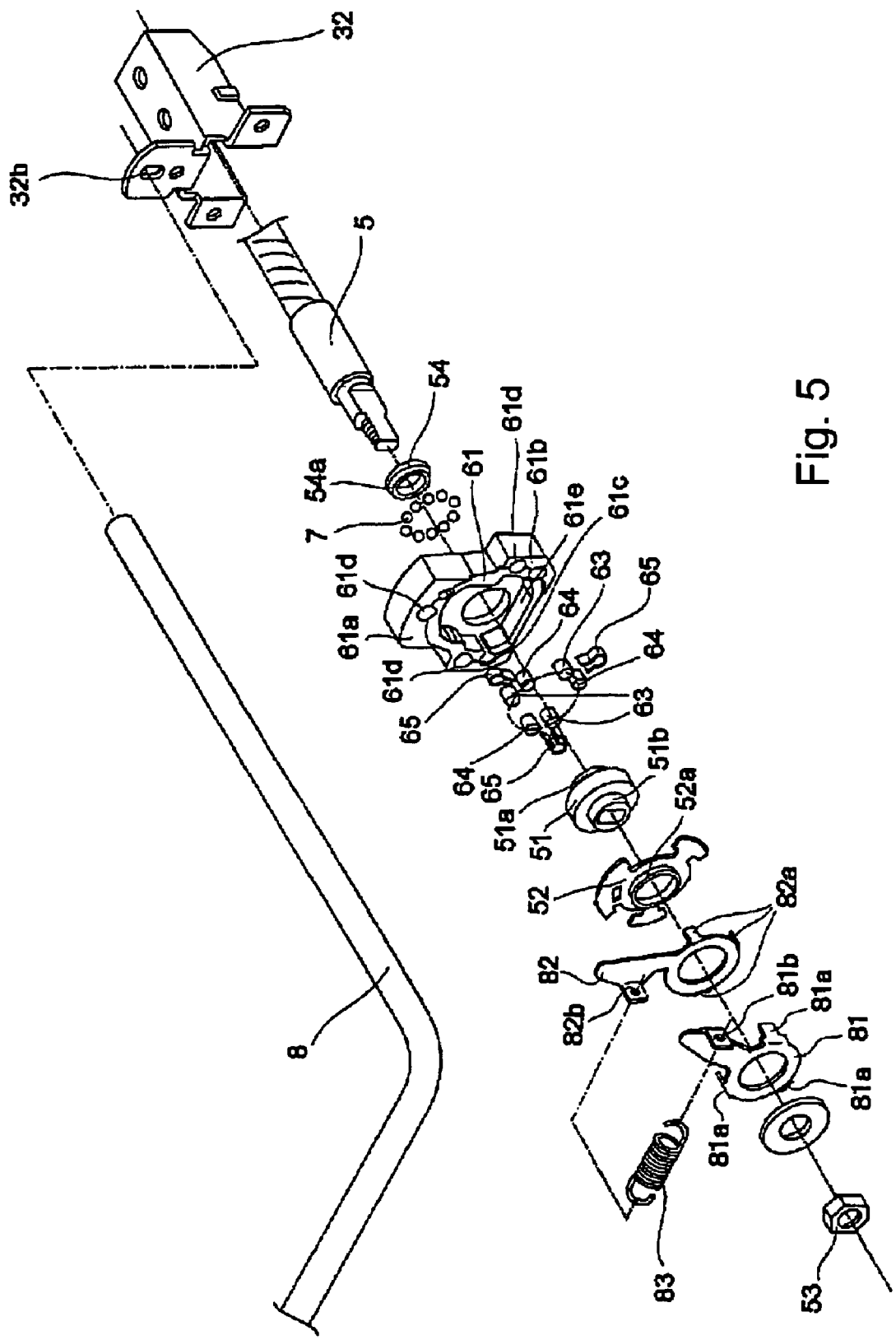
FIG. 5 is an exploded perspective illustration showing a lock mechanism 6 provided to a seat rail apparatus 1 in accordance with a second embodiment.
Figure 7:
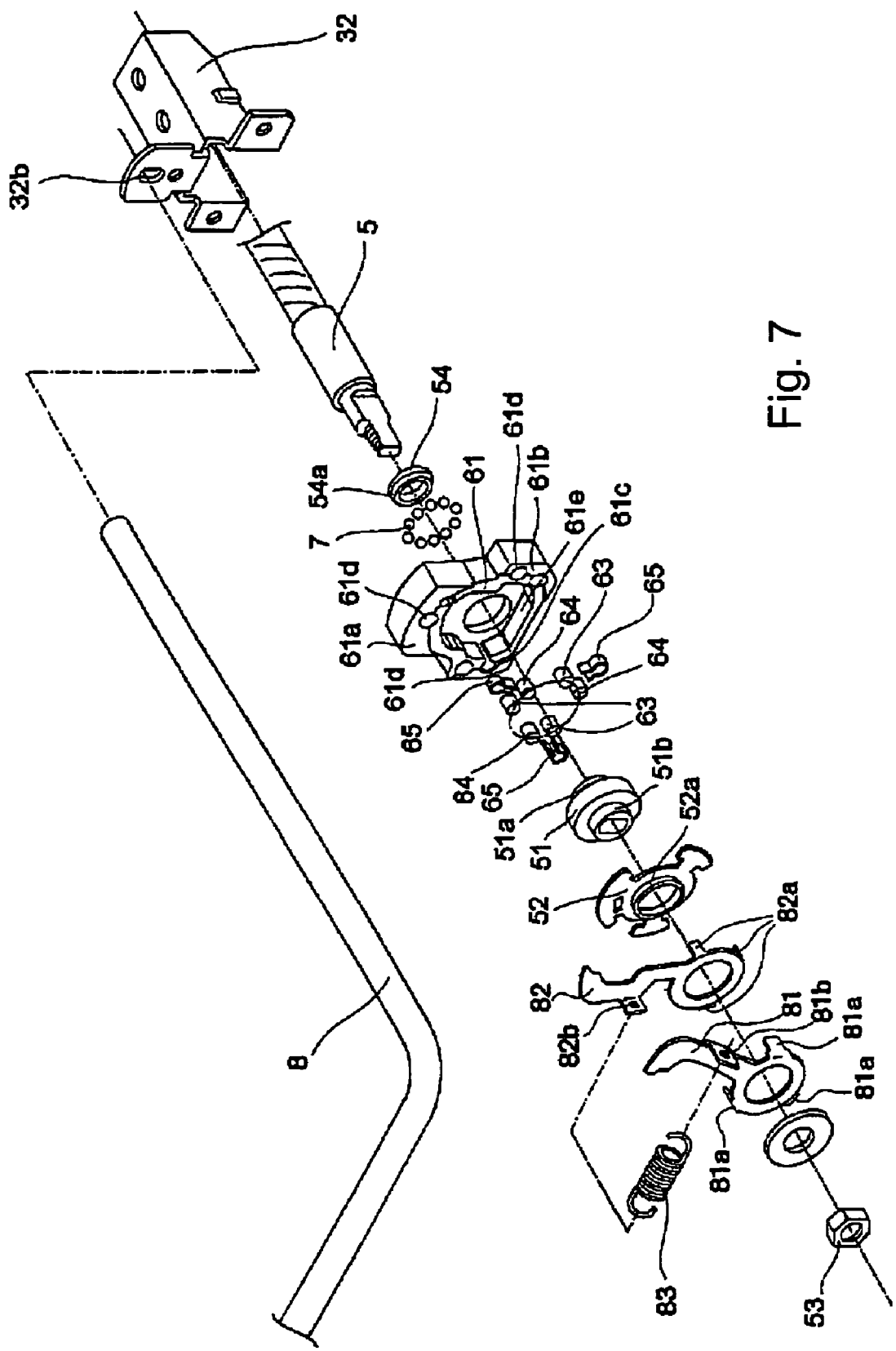
FIG. 7 is an exploded perspective illustration of a lock mechanism provided to a seat rail apparatus in accordance with a third embodiment.
Figure 8B:
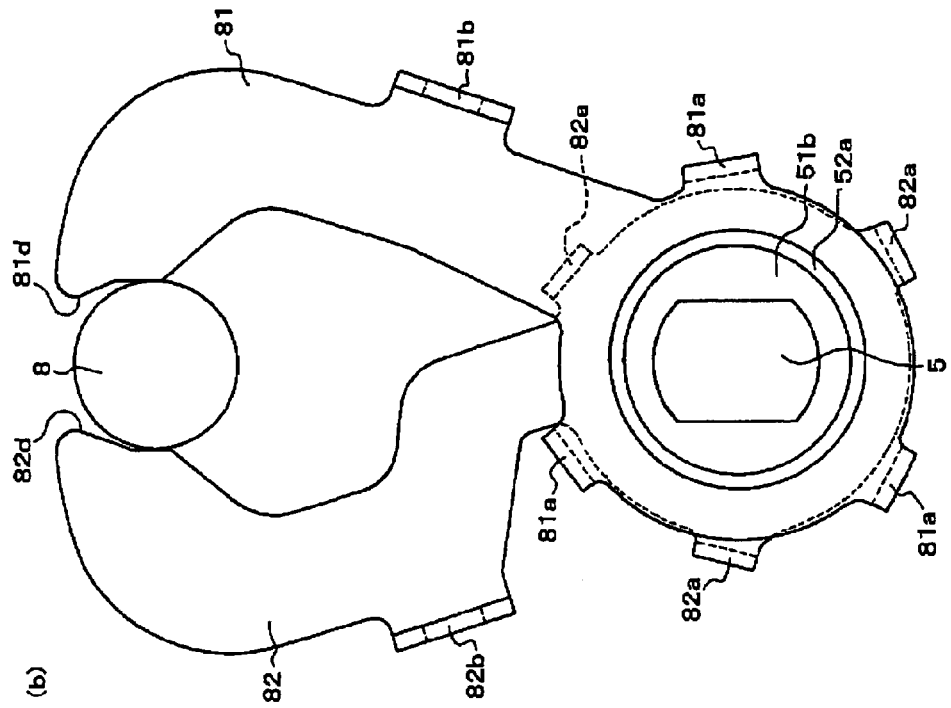
FIG. 8 are illustrations showing the operation of a first engagement plate 81 and a second engagement plate 82 provided to the lock mechanism 6 shown in FIG. 7.
Figure 8A:
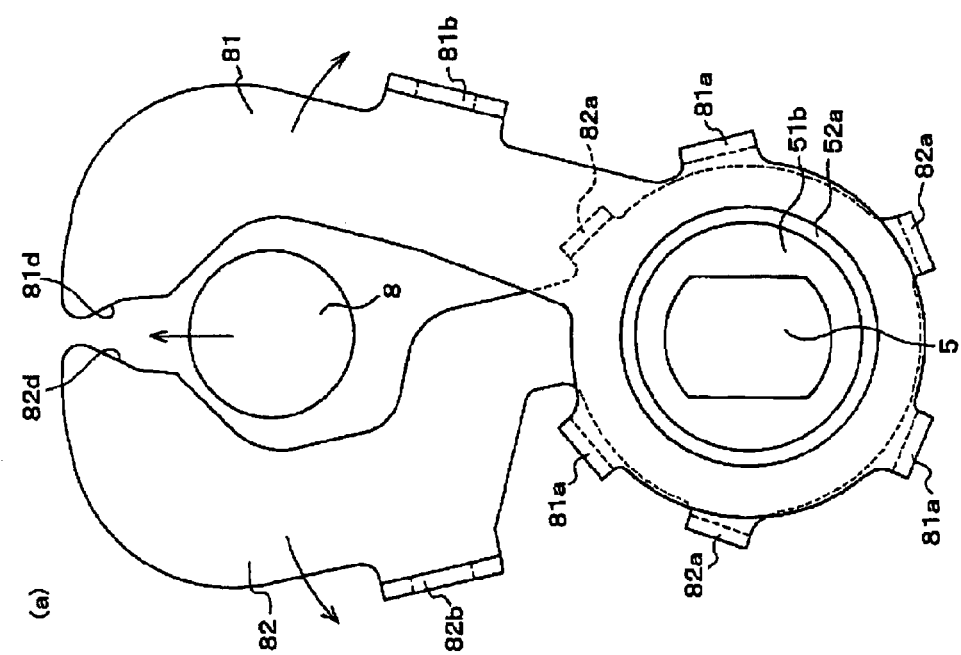

EXPLANATION OF SYMBOLS 1 seat rail apparatus
2 lower rail member
3 upper rail member
4 nut
5 slide screw
51 brake disk
54 inner ring
6 lock mechanism
61 supporting member
61e disposition section
63 leftward-rolling roller
64 rightward-rolling roller
7 ball
8 operation lever
81 first engagement plate
81c engagement projection
82 second engagement plate
82c engagement projection
84a first contact portion
84b second contact portion

The invention claimed is:

1. A seat rail apparatus, comprising:

a lower rail member fixed to a floor face of a vehicle and an upper rail member fixed to a seat of the vehicle, the upper rail member being slidable with respect to the lower rail member;

a screw disposed along the longitudinal direction of either one of the lower rail member and the upper rail member, the screw having a lead angle and a self-locking angle of friction, wherein the screw's lead angle is larger than its self-locking angle of friction;

a nut fixed to the other one of the lower rail member or the upper rail member and screwed with the screw; and a lock mechanism capable of arbitrarily locking the rotation of the screw provided to the rail member disposed with the screw;

the seat rail apparatus being capable of, when the lock mechanism locks the rotation of the screw, holding the upper rail member at an arbitrary position to restrict the forward/backward sliding with respect to the lower rail member, wherein the screw is provided with a brake disk on the same axis thereof, the lock mechanism is provided with a rolling member, a force imparting member for imparting a force to the rolling member in a specific direction and a supporting member for holding the same, the rolling member and the force-imparting member are disposed on the periphery of the brake disk, the force-imparting member imparts the force to the rolling member in the periphery direction, and the supporting member is disposed with the force-imparting member and the rolling member therein, the rolling member, being imparted with the force by the force-imparting member, is sandwiched between the brake disk and the supporting member and engaged with friction therewith, and by means of the friction engagement, the rotation of the screw can be locked, and in order to lock the rotation of the brake disk in the clockwise/counterclockwise direction, at least one rolling member is disposed for each direction, the lock mechanism is provided with an operating member for releasing the rolling member from the friction engagement to release the lock of the screw.

2. The seat rail apparatus according to claim 1, wherein the operating member includes first and second engagement plates disposed on the identical axle and a operation lever, and the first and second engagement plate are formed with an operating piece and a contact piece respectively, the peripheral side face of the operation lever engages with the contact piece, and the operating piece comes into contact with the rolling member, when the operation lever is operated, the operation lever moves vertically, the peripheral side face of the operation lever comes into contact with the contact piece of the first engagement plate to rotate the same clockwise and simultaneously comes into contact with the contact piece of the second engagement plate to rotate the same counterclockwise, thereby the operating piece causes the rolling member to roll in the direction against the force imparted by the force imparting member.

3. The seat rail apparatus according to either of claims 1 or 2, wherein a plurality of the rolling members is disposed on the periphery around the rotation shaft of the screw to lock the rotation of the brake disk in the clockwise and counterclockwise directions, and a plurality of the force imparting members and operating pieces of the first and second engagement plates are also provided corresponding to the number of the rolling members, the plurality of the rolling members, which neighbors to each other and rotates in the direction different from each other, are caused to roll simultaneously by the operating pieces.

4. The seat rail apparatus according to claim 3, wherein, including the rolling member, the force imparting member, and the operating pieces of the first and second engagement plate, which are capable of causing the rolling member to roll, as a set, one set thereof is disposed on the periphery of the brake disk at the upper portion side of the supporting member, and two sets thereof are disposed at the lower portion sides of the supporting member in a substantially triangle configuration having the one set at the upper portion side of the supporting member as the apex thereof.

5. The seat rail apparatus according to either of claims 1 or 2, wherein the lock mechanism is attached to the front-end portion of the upper rail member, the brake disk is attached to front end portion of the screw and the front-end portion of the screw is pivoted by the lock mechanism.

* * * * *